(12) United States Patent
Katou

(10) Patent No.: US 7,536,852 B2
(45) Date of Patent: May 26, 2009

(54) COMBUSTION AIR-FUEL RATIO CONTROL SYSTEM FOR AN INTERNAL COMBUSTION ENGINE

(75) Inventor: Hiroshi Katou, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 331 days.

(21) Appl. No.: 11/491,804

(22) Filed: Jul. 24, 2006

(65) Prior Publication Data
US 2007/0017213 A1 Jan. 25, 2007

(30) Foreign Application Priority Data
Jul. 25, 2005 (JP) ............................. 2005-214084

(51) Int. Cl.
*F01N 3/00* (2006.01)
(52) U.S. Cl. ............................. 60/284; 60/285; 60/287
(58) Field of Classification Search .................. 60/284, 60/285, 293, 287, 289
See application file for complete search history.

(56) References Cited

U.S. PATENT DOCUMENTS 4,450,680 A * 5/1984 Otsuka et al. .................. 60/274
5,529,048 A * 6/1996 Kurihara et al. ............. 123/685
6,044,643 A * 4/2000 Ittner et al. .................... 60/289
6,813,883 B1 * 11/2004 Lewis .......................... 60/289

FOREIGN PATENT DOCUMENTS

JP 01083817 A * 3/1989
JP 06-146867 5/1994

* cited by examiner

*Primary Examiner*—Thomas E Denion
*Assistant Examiner*—Jonathan Matthias
(74) *Attorney, Agent, or Firm*—Global IP Counselors, LLP

(57) ABSTRACT

A combustion air-fuel ratio control system controls the combustion air-fuel ratio when the warming-up of the catalyst is required and achieves an increase in the catalyst temperature at an early stage. When warming up of the catalyst is requested it determines whether or not the exhaust air-fuel ratio sensors that detect the exhaust air-fuel ratio upstream the catalyst on the exhaust passage is active, and if the exhaust air-fuel ratio sensor is inactive, it sets the combustion air-fuel ratio to the primary combustion air-fuel ratio, which is between the theoretical ratio and the combustion limit air-fuel ratio, which is richer than the theoretical ratio and allows stable combustion using open control, and if the exhaust air-fuel sensor is active, it sets the combustion air-fuel ratio to the secondary combustion air-fuel ratio, which is richer than the primary combustion air-fuel ratio and near the combustion limit air-fuel ratio using feedback control.

7 Claims, 4 Drawing Sheets

COMBUSTION AIR-FUEL RATIO CONTROL SYSTEM FOR AN INTERNAL COMBUSTION ENGINE

CROSS-REFERENCES TO RELATED APPLICATION

This application claims priority from Japanese Patent Application Serial No. 2005-214084 filed Jul. 25, 2005, the content of which is incorporated herein by reference in its entirety.

TECHNICAL FIELD

Described herein is a device that controls a combustion air-fuel ratio in a combustion chamber for an internal combustion engine in which fresh air is supplied to an exhaust passage of the internal combustion engine.

BACKGROUND

Japanese Laid Open Patent No. H06-146867 discloses a combustion engine having a fresh air supplying device capable of supplying fresh air upstream of an exhaust purification catalyst, which is arranged in an exhaust passage, and of controlling the combustion air-fuel ratio in a combustion chamber so as to be rich when warming-up of the catalyst is required, and at the same time, operating a fresh air supplying device to supply fresh air to the exhaust passage.

SUMMARY

In the present control system, the combustion air-fuel ratio is controlled when warming-up of the catalyst is required so that the catalyst temperature is increased at an early stage. The system comprises an exhaust passage where exhaust from the internal combustion engine is guided; an exhaust purification catalyst that is arranged downstream of the exhaust passage, a fresh air supplying device that supplies fresh air, upstream of the exhaust purification catalyst, an exhaust air-fuel ratio sensor that detects an exhaust air-fuel ratio, upstream of the exhaust purification catalyst and downstream of a fresh air supplying position, an exhaust air-fuel ratio sensor activation determining unit that determines whether or not the exhaust air-fuel ratio sensor is active, and a combustion air-fuel ratio control unit that supplies the fresh air from the fresh air supplying device to the exhaust passage when warming up of the exhaust purification catalyst is requested. When the exhaust air-fuel ratio sensor is inactive, a combustion air-fuel ratio is open-controlled to be a primary combustion air-fuel ratio which is between a theoretical air-fuel ratio and a combustion limit air-fuel ratio that is richer than the theoretical air-fuel ratio, and wherein when the exhaust air-fuel ratio sensor is active, the combustion air-fuel ratio is controlled in a feedback manner to be a secondary combustion air-fuel ratio that is richer than the primary combustion air-fuel ratio and closer to the combustion limitation air-fuel ratio while the combustion air-fuel ratio is estimated based on the exhaust air-fuel ratio that is detected by the exhaust air-fuel ratio sensor. According to the present invention, the combustion air-fuel ratio is controlled when warning-up of the catalyst is required and an increase in the catalyst temperature at an early stage can be achieved.

BRIEF DESCRIPTION OF DRAWINGS

Other features and advantages of the present combustion air-fuel ratio control system will be apparent from the ensuing description, taken in conjunction with the accompanying drawings, in which.

DETAILED DESCRIPTION

Figure 1:
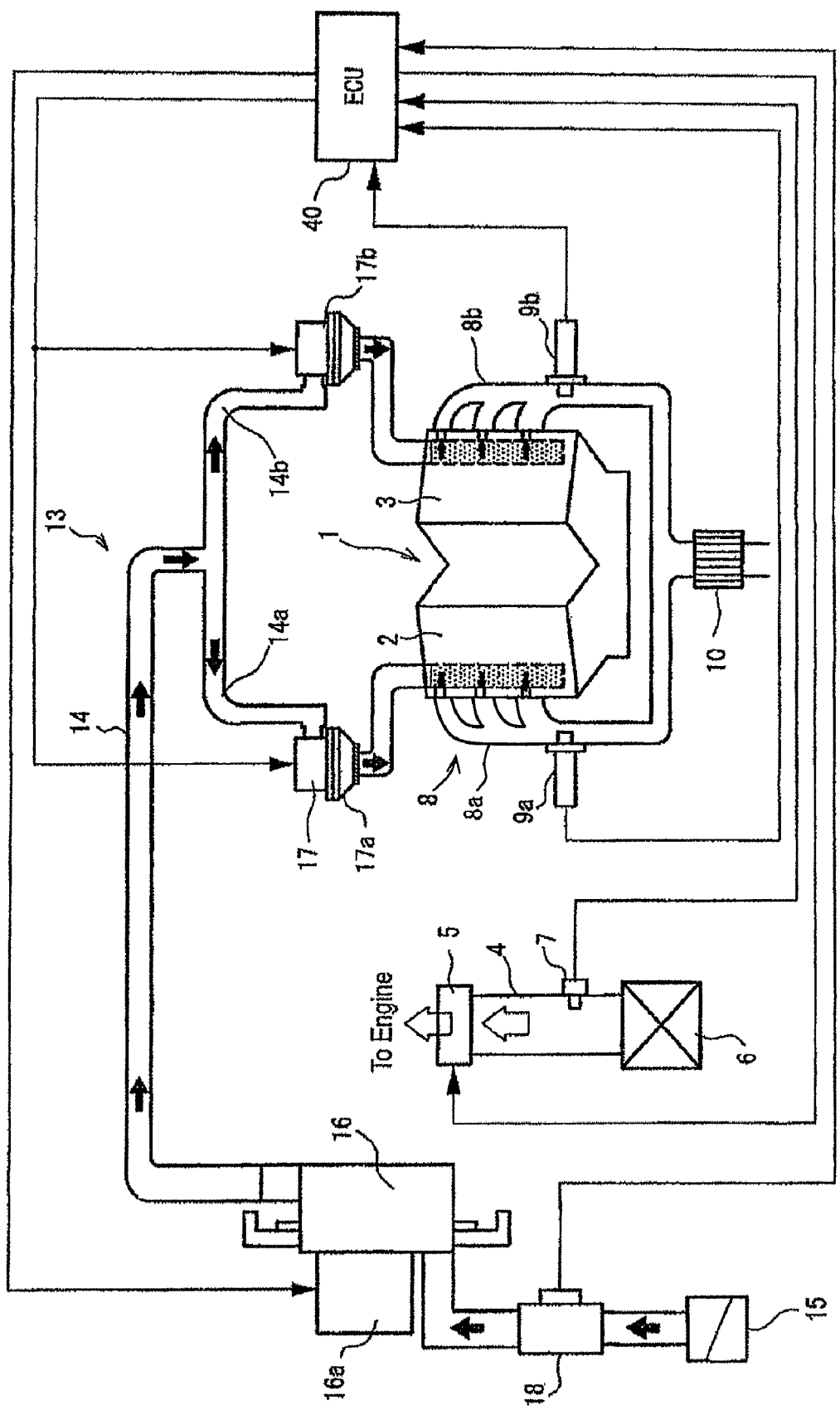
FIG. 1 is a schematic view of a fresh air supplying device for an internal combustion engine.

While the claims are not limited to the illustrated embodiments, an appreciation of various aspects of the combustion air-fuel ratio control system is best gained through a discussion of various examples thereof.

An embodiment of the present invention is described in detail, referring to the drawings.

FIG. 1 is a schematic view of a combustion air-fuel ratio control device for a combustion engine, in which a fresh air supplying device 13 is applied to a 6-cylinder V-type internal combustion engine 1 (hereinafter referred to as the "engine"). An inlet passage 4 that introduces air into each of the cylinders is formed on left and right banks 2 and 3 of the engine 1. In FIG. 1, the inlet passage 4, which is located adjacent to the banks 2, and 3 is not shown.

An electronically controlled throttle valve 5 that controls air intake flow amount is arranged upstream of an inlet passage 4, and an intake air cleaner 6 is arranged on the inlet passage 4, upstream of the valve 5. An air flowmeter 7 that detects the air flow amount taken in the engine 1 (primary air flow amount) is arranged on the inlet passage 4 between the electronically controlled throttle valve 5 and the air cleaner 6. The air for the engine 1 passes through the air cleaner 6 and the electronically controlled throttle valve 5, and then is introduced into the cylinders via the inlet manifold and the inlet ports (not shown).

The engine 1 has six cylinders divided into two groups, the left bank 2 and right bank 3, and fuel is injected from a fuel injection valve 11 (FIG. 4) into the air which is introduced to each of the cylinders so that combustion is carried out. An exhaust passage 8 of the engine 1 comprises a primary exhaust passage 8a that is connected to the left bank 2 and a secondary exhaust passage 8b that is connected to the right bank 3. These exhaust passages are joined together on the downstream side.

An exhaust purification catalyst 10, which is an exhaust purification device, is arranged in the exhaust passage 8, downstream of an joined portion of the primary exhaust passage 8a and the secondary exhaust passage 8b. The catalyst 10 is activated at or above a predetermined temperature so as to carry out an exhaust purification function. A primary exhaust air-fuel ratio sensor 9a that detects the actual air-fuel ratio (oxygen concentration) in the exhaust is arranged upstream of the catalyst 10 and downstream of the fresh air supplying position(s) on the primary exhaust passage 8a. A secondary exhaust air-fuel ratio sensor 9b that detects the actual air-fuel ratio in the exhaust is arranged upstream of the catalyst 10 and downstream of the fresh air supplying position(s) on the secondary exhaust passage 8b. These exhaust air-fuel ratio sensors 9a and 9b are activated when the detecting portion reaches at or above the predetermined temperature so that the exhaust air-fuel ratio can be detected.

In addition, the exhaust ports formed at the cylinder head of the engine 1 also form exhaust passages 8a and 8b and in FIG. 1, a fresh air supplying passage 14 that supplies fresh air from the fresh air supplying device 13 is connected to each of the exhaust ports (exhaust passages 8a and 8b). An air cleaner 15 for fresh air, an air pump 16, and opening/closing valves 17 (air switching valves) are arranged in the fresh air supplying passage 14 in that order from the air intake side towards the exhaust passage 8 of the engine 1. A detector 18 that detects the amount of fresh air flow to be supplied to the exhaust passage 8 (for example, an air flowmeter, or a device that combines an orifice and a differential pressure sensor and temperature sensor) via the air pump 16 is arranged in the fresh air supplying passage 14 between the air cleaner 15 and air pump 16.

That is, the air pump 16 pressure-feeds fresh air via the fresh air supplying passage 14 to the exhaust passages 8a and 8b for the respective banks 2 and 3 of the engine 1. The amount of fresh air flow in the air pump 16 is controlled by an air pump driving device 16a. The air pump driving device 16a receives an operation signal from an engine control unit 40 (hereinafter referred to as the "ECU") so as to drive the air pump 16.

The fresh air supplying passage 14 is divided into a primary branch passage 14a that supplies fresh air to the primary exhaust passage 8a and a secondary branch passage 14b that supplies fresh air to the secondary exhaust passage 8b, downstream of the air pump 16. The primary opening/closing valve 17a that selectively supplies or blocks fresh air to the primary exhaust passage 8a is arranged on the primary branch passage 14a. The secondary opening/closing valve 17b that selectively supplies or blocks fresh air to the secondary exhaust passage 8b is arranged on the secondary branch passage 14b. In FIG. 1, the primary branch passage 14a is connected to the primary exhaust passage 8a that is formed on the cylinder head, and the secondary branch passage 14b is connected to the secondary exhaust passage 8b.

The opening and closing states of these opening/closing valves 17a and 17b are controlled by the opening signal or closing signal outputted from the ECU 40. The ECU 40 controls the opening/closing valves 17a and 17b to be open when the catalyst 10 is not activated immediately after the engine 1 is started, and at the same time, it drives the air pump 16 so that fresh air is supplied to the exhaust passages 8a and 8b, whereby fresh air is supplied to the exhaust passages 8a for the bank 2 and exhaust passage 8b for the bank 3 via the respective branch passages 14a and 14b of the fresh air supplying passage 14, and the increase in the temperature is promoted so that the catalyst 10 may reach the activation temperature.

Figure 4:
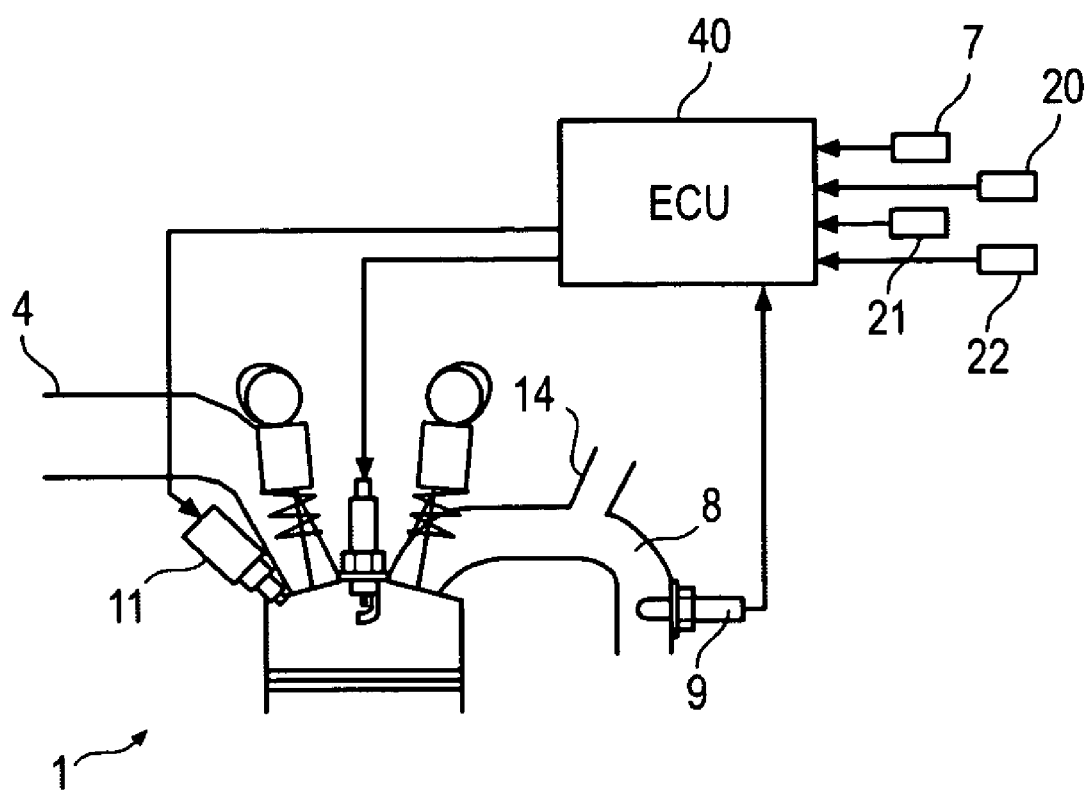
FIG. 4 is a schematic structural diagram that shows the vicinity of the combustion chamber of an internal combustion engine.

In addition, as shown in FIG. 1, for example, signals from the above-mentioned air flowmeter 7 for the intake air, the exhaust air-fuel ratio sensors 9a and 9b, and fresh air flow amount detection device 18, etc., are inputted to the ECU 40 in order to detect the operation conditions of the engine 1 and to carry out various processes. In addition, for example, in order to detect the operation condition of the engine 1, signals from, for example, as shown in FIG. 4, a revolution speed sensor 20 that detects the engine revolution speed, a water temperature sensor 21 that detects the engine water temperature, and a vehicle speed sensor 22 that detects the vehicle speed signal, are inputted to the ECU 40. The ECU 40 carries out various calculations, based on these input signals and controls, for example, the aperture of the electrically controlled throttle valve 5, the amount of the fuel injection valve, the driving of the air pump 16, and the opening and closing of the opening/closing valves 17a and 17b.

Next, an operation of the fresh air supplying device 13 will be described below. The fresh air supplying device 13, for example, controls the opening of the opening/closing valves 17a and 17b (cut valve) by the signal(s) from the ECU 40, when a request for warming up the catalyst 10 is made such as for a cold start of the engine 1, when the temperature of the catalyst 10 is not raised to the degree capable of fulfilling the exhaust purification function, or when the exhaust air-fuel ratio sensors 9a and 9b are not activated to the degree capable of detection of the air-fuel ratio in the exhaust.

In this case, when the ECU 40 operates the air pump 16 so that the air that passes through the air cleaner 15 can be supplied so that the fresh air flows to the exhaust passage 8a for the bank 2 and the exhaust passage 8b for the bank 3 via the respective branch passages 14a and 14b of the fresh air supplying passage 14, whereby the level of oxygen in the exhaust that flows into the catalyst 10 downstream of the fresh air supplying position of the exhaust passages 8a and 8b increases, and the combustion of the HC and CO, which are the unburned components in the exhaust, is enhanced so that the temperature of the catalyst is increased. However, since when it is left as is, the fresh air is overly supplied, the unburned components in the exhaust will become insufficient.

Therefore, in order to further raise the catalyst temperature, the ECU 40 controls the combustion air-fuel ratio in the combustion chamber to be rich in order to supply additional unburned components to catalyst 10 thereby enhancing the temperature raise of the catalyst 10, so that the catalyst function can be achieved at an early stage, and therefore, a deterioration of emissions can be prevented. In this case, detecting portions of the exhaust air-fuel ratio sensors 9a and 9b can be activated at an early stage by the exhaust and fresh air.

Figure 2:
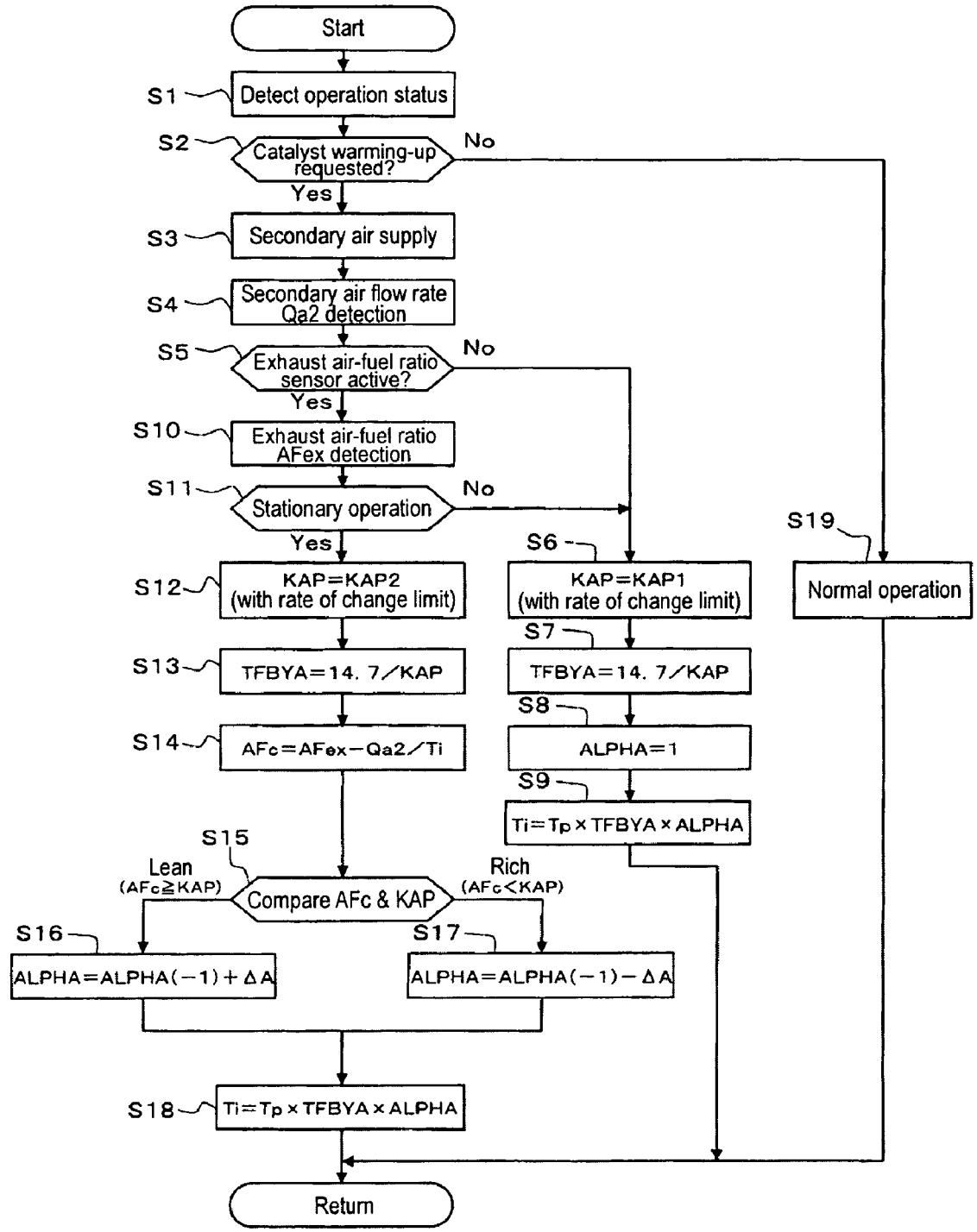
FIG. 2 is a flow chart of the combustion air-fuel ratio control for an internal combustion engine.
Figure 3:
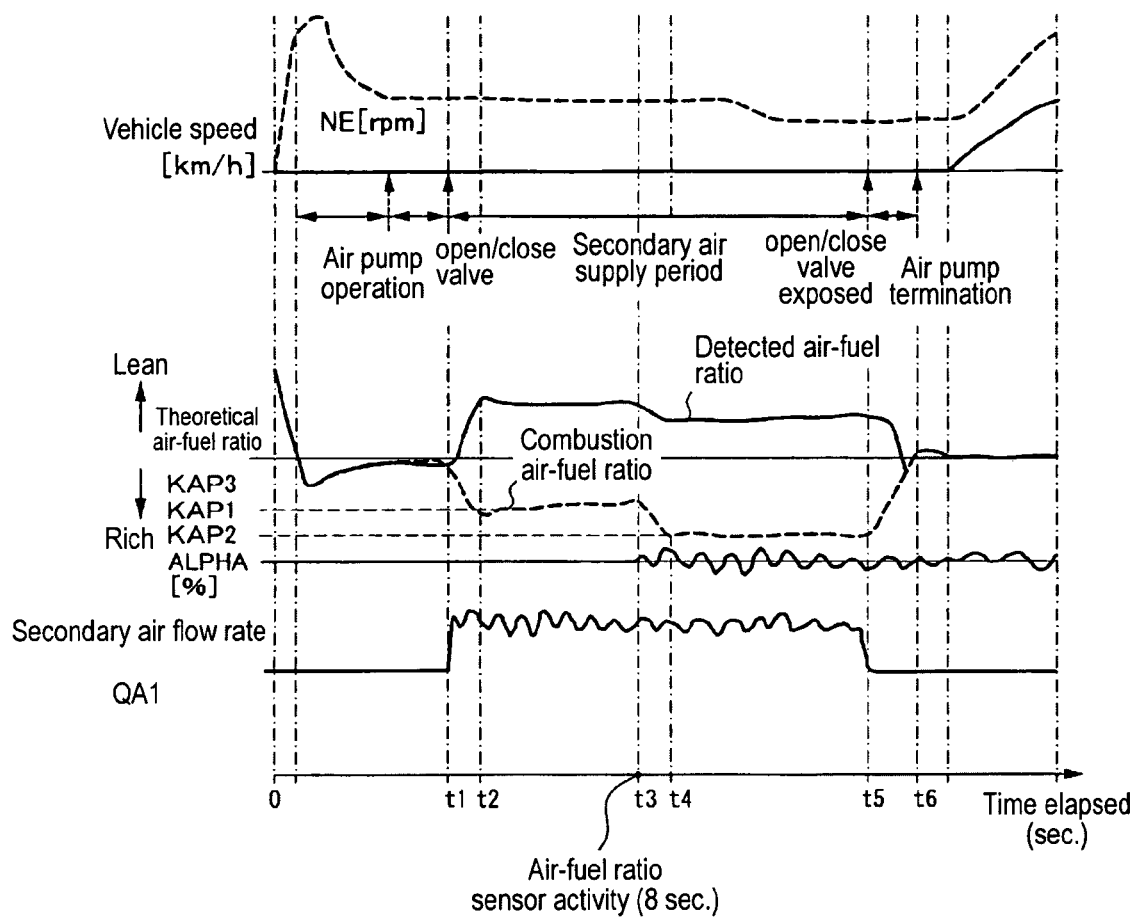
FIG. 3 is a time chart of a combustion air-fuel ratio control.

Next, the combustion air-fuel ratio control of the engine 1 is described in detail, referring to the flowchart of FIG. 2. The process in this flowchart is repeated for every predetermined period (for example, every 10 millisecond). In addition, a time chart in FIG. 3 shows transitions of each parameter when the exhaust air-fuel ratio control is carried out. As shown in FIG. 2, at a step S1, the operation status of the engine 1 is detected, that is, for example, intake air flow amount Qa1, the engine water temperature, the engine revolution speed and the temperature of the catalyst 10 are detected.

At a step S2, whether or not the warming up of the catalyst 10 is requested is determined. For example, when the engine water temperature is less than the predetermined temperature, it is determined that the warming up of the catalyst is requested.

At a step S3, the fresh air supplying device 13 supplies fresh air to the exhaust passages 8a and 8b. This is carried out such that the ECU 40 outputs the air pump driving signal and at the same time outputs the opening signal of the opening/closing valves 17a and 17b to open the opening/closing valves 17a and 17b, and therefore fresh air is supplied from the branch passages 14a and 14b of the fresh air supplying passage 14 to the exhaust passages 8a and 8b.

At a step S4, the flow amount Qa2 of the fresh air to be supplied to the exhaust passages 8a and 8b is detected, based on the signals outputted from the fresh air flow amount detection device 18 that is arranged on the fresh air supplying passage 14. At a step 5, whether the exhaust air-fuel ratio sensors 9a and 9b are active or non-active is determined, based on, for example, whether or not the predetermined period of time (8 seconds in FIG. 3) has passed. Or, when the number of inversions outputted from the exhaust air-fuel ratio sensors 9a and 9b is at or greater than the predetermined number (for example one time), it is determined that the exhaust air-fuel ratio sensors 9a and 9b are activated. When it is determined that the exhaust air-fuel ratio sensors 9a and 9b are not active, it proceeds to steps 6 to 9 and the control of the combustion air-fuel ratio is carried out in an open control manner. When it is determined that the air-fuel ratio sensors 9a and 9b are active, then it proceeds to steps 10 to 18 that are described later, and control of the combustion air-fuel ratio is carried out in a feedback control manner.

At a step S6, a target combustion air-fuel ratio KAP in the combustion chamber of the engine 1 is set to be a primary combustion air-fuel ratio KAP 1 (KAP 1=12 in FIG. 3), which allows stable combustion between the theoretical air-fuel ratio and the combustion limit air-fuel ratio, which is richer than the theoretical air-fuel ratio. The combustion air-fuel ratio is obtained by dividing the weight of air contained in air-fuel mixture by the weight of fuel. The theoretical air-fuel ratio is defined as air-fuel ratio at which in theory, the fuel is completely combusted when air is mixed with fuel. The combustion limit air-fuel ratio is defined as air-fuel ratio representing a limit, at which the combustion in the engine cannot continue below the limit. However, when the difference between the combustion air-fuel ratio and the primary combustion air-fuel ratio KAP 1 is at or greater than the predetermined value, uneven torque that rapidly change the combustion air-fuel ratio is generated. In order to suppress the change, the change rate of the combustion air-fuel ratio is controlled.

The control of the change rate of the target combustion air-fuel ratio KAP is carried out such that, for example, in FIG. 3, when the current combustion air-fuel ratio is switched from a state close to the theoretical air-fuel ratio to the primary combustion air-fuel ratio KAP 1, if the difference between the current combustion air-fuel ratio and the primary combustion air-fuel ratio KAP 1 is at or greater than the predetermined value, then it determines that the change rate is large, and the target combustion air-fuel ratio is set to a combustion air-fuel ratio that differs by a predetermined upper limit value from the current combustion air-fuel ratio in the direction of the primary combustion air-fuel ratio KAP 1.

At a step S7, the target combustion air-fuel ratio KAP that is set in Step 6 is converted to the target combustion equivalent ratio TFBYA. When the theoretical air-fuel ratio is 14.7, the target combustion equivalent ratio TFBYA is expressed by the formula set forth below, using the target combustion air-fuel ratio. In addition when the target combustion air-fuel ratio is the theoretical air-fuel ratio, the target combustion equivalent ratio becomes one (1).

$$TFBYA=14.7/KAP \qquad (1)$$

At a step S8, the exhaust air-fuel ratio sensors 9a and 9b are not activated and the open control is carried out, the feedback compensating coefficient ALPHA is set to 1 (See FIG. 3).

At a step S9, as shown in the formula set forth below, the fuel injection amount (the amount of fuel to be supplied) Ti from the fuel injection valve is calculated by multiplying the basic fuel injection amount Tp, by the target combustion equivalent ratio TFBYA and the feedback compensation coefficient ALPHA (wherein ALPHA=1).

$$Ti=Tp\times TFBYA\times ALPHA \qquad (2)$$

The ECU 40 outputs the fuel injection signal to the fuel injection valve in correspondence to the calculated fuel injection amount Ti.

By repeating the process from the steps S6 to S9, as shown in FIG. 3, since the change rate of the combustion air-fuel ratio is controlled during elapsed time t1 and t2 so that the combustion air-fuel ratio will be smoothly transitioned to the primary combustion air-fuel ratio KAP 1, uneven torque from the engine 1 can be avoided. In addition, during the elapsed time t2 to t3, the primary combustion air-fuel ratio KAP 1 can be controlled to approximately be a constant value (combustion air-fuel ratio=12). The stable combustion is securely maintained to prevent the deterioration of operatability or misfires.

In addition, when it is determined that the exhaust air-fuel ratio sensors 9a and 9b are active at a step 5, a feedback control is carried out by taking into account signals outputted from the exhaust air-fuel ratio sensors 9a and 9b at steps S10 to S18. At the step S10, the exhaust air-fuel ratio AFex is detected. A value calculated based on signals outputted from the exhaust air-fuel ratio sensors 9a and 9b is used as the exhaust air-fuel ratio AFex.

At the step S11, whether or not the operation status of the engine 1 is stationary is determined. For example, it determines that it is non-stationary when the change in the intake air flow amount Qa1 of the engine 1 is at or greater than a predetermined level, and it determines that it is stationary when it is less than the level. This decision is carried out, for example, based on change in the intake air flow amount Qa1, which is based on signal outputted from the air flowmeter 7, or the change of the aperture of the electronically controlled throttle valve 5. When the operation status of the engine 1 is determined to be stationary, it proceeds to the step S12. When the operation status is determined to be non-stationary, it proceeds to the step S6.

For other examples, it determines that the operation status of the engine is non-stationary when a change of a required output torque of engine calculated by a vehicle speed and an accelerator pedal stepping quantity by driver is at or greater than a predetermined level, and it determines that it is stationary when it is less than the level. In other word, it means the change of required load to an engine is smaller than a predetermined level.

At the step S12, the target combustion air-fuel ratio KAP in the combustion chamber of the engine 1 is set to be a secondary combustion air-fuel ratio KAP 2 (in FIG. 3, KAP 2=10), which is on the rich side compared to the primary combustion air-fuel ratio KAP 1 and near the combustion limit air-fuel ratio. However, when the difference between the combustion air-fuel ratio and the secondary combustion air-fuel ratio KAP 2 is at or greater than the predetermined value, uneven torque that rapidly changes the combustion air-fuel ratio is generated. In order to suppress the change, the change rate for the combustion air-fuel ratio is limited.

The limitation of the change rate of the target combustion air-fuel ratio KAP is carried out such that, for example, in FIG. 3, when the current combustion air-fuel ratio is switched from the primary combustion air-fuel ratio KAP 1 to the secondary combustion air-fuel ratio KAP 2, if the difference between the current combustion air-fuel ratio and the secondary combustion air-fuel ratio KAP 2 is at or greater than the predetermined value, then it determines that the rate change is large, and the target combustion air-fuel ratio is set to a combustion air-fuel ratio that, differs by the predetermined upper limit value from the current combustion air-fuel ratio in the direction of the secondary combustion air-fuel ratio KAP 2.

At the step S13, the target combustion air-fuel ratio KAP that is set in the step 12 is converted to the target combustion equivalent ratio TFBYA. When the theoretical air-fuel ratio is 14.7, the target combustion equivalent ratio TFBYA is expressed by the formula set forth below, using the target combustion air-fuel ratio.

$$TFBYA=14.7/KAP \qquad (3)$$

At the step S14, as shown in the formula set forth below, the combustion air-fuel ratio AFc in the combustion chamber is estimated by subtracting a value, in which the fresh air supply amount Qa2 is divided by the fuel injection amount Ti, from the exhaust air-fuel ratio AFex that is detected by the exhaust air-fuel ratio sensors 9a and 9b.

$$AFc=AFex-Qa2/Ti \quad (4)$$

The fuel injection amount that is set in the step 9 as a default is used as the fuel injection amount Ti in this formula, and when the feedback control is carried out, the fuel injection amount set in the step 18 which is described later, is used. At the step 15, the target combustion air-fuel ratio KAP that is set at the step 12 and the combustion air-fuel ratio AFc that is estimated at the step 14 are compared with each other 4, whereby whether or not the estimated combustion air-fuel ratio AFc has reached the target combustion air-fuel ratio KAP (in FIG. 3, combustion air-fuel ratio=10) is determined so that the feedback control is carried out.

When the estimated combustion air-fuel ratio AFc is the same as or leaner than the target combustion air-fuel ratio KAP (AFc≧KAP), it proceeds to the step 16 and when the estimated combustion air-fuel ratio AFc is richer than the target combustion air-fuel ratio KAP (AFc≧KAP2), it proceeds to the step 17, whereby the control amount during the feedback control of the combustion air-fuel ratio can be changed so as to correspond to the estimated combustion air-fuel ratio AFc.

At the step 16, the combustion air-fuel ratio has an overly lean condition and in order to bring the combustion air-fuel ratio back to the rich side, the feedback compensating coefficient ALPHA is found by adding the predetermined value AA to the previous value ALPHA (−1) (ALPHA=ALPHA (−1)+ΔA). By doing so, the feedback compensating coefficient ALPHA can be used to compensate the shift to the rich side.

At the step 17, the combustion air-fuel ratio has an overly rich condition and in order to bring the combustion air-fuel ratio to the lean side, the feedback compensating coefficient ALPHA is found by subtracting the predetermined value AA from the previous value ALPHA (−1) (ALPHA=ALPHA (−1)−ΔA) By doing so, the feedback compensating coefficient ALPHA can be used to compensate the shift to the lean side.

At the step 18, as shown in the formula set forth below, the fuel injection amount Ti from the fuel injection valve is found by multiplying the principle fuel injection amount Tp by the target combustion equivalent ratio TFBYA (the value found in Step 13) and the feedback compensating coefficient ALPHA (the value found in Steps 16 or 17).

$$Ti=Tp \times TFBYA \times ALPHA \quad (5)$$

The ECU 40 outputs the fuel injection signal to the fuel injection valve in correspondence to the calculated fuel injection amount Ti. As described above, while the combustion air-fuel ratio in the combustion chamber is estimated based on the exhaust air-fuel ratio detected by the exhaust air-fuel ratio sensors 9a and 9b, the combustion air-fuel ratio is controlled in a feedback manner so as to be the secondary combustion air-fuel ratio KAP2.

As described above, the combustion air-fuel ratio can be controlled as shown in FIG. 3 by setting the feedback compensating coefficient ALPHA through a comparison between the estimated combustion air-fuel ratio AFc and the target combustion air-fuel ratio KAP2, and controlling the fuel injection amount Ti that is injected from the fuel injection valve in a feedback manner. In other words, when the change rate of the combustion air-fuel ratio is limited during the elapsed time t3 to t4, the uneven torque of the engine 1 can be avoided by smoothly transitioning the combustion air-fuel ratio to the secondary combustion air-fuel ratio KAP2. Also, during the elapsed time t4 to t5, the feedback compensating coefficient ALPHA is determined in order to maintain the combustion air-fuel ratio at the secondary combustion air-fuel ratio KAP2, and the combustion air-fuel ratio can then be controlled in a feedback manner. In addition, by maintaining the combustion air-fuel ratio at the secondary combustion air-fuel ratio KAP2, a large amount of non-burned components can be discharged to the exhaust passages 8a and 8b thereby allowing activation of catalyst 10 at an early stage.

Furthermore, when the temperature of the catalyst becomes a predetermined temperature or greater by the combustion air-fuel ratio control, it is assumed that the warming up of the catalyst is not requested and it proceeds from the step S2 to Step 19 so that normal control is carried out.

As shown in FIG. 3, the tertiary combustion air-fuel ratio KAP3 during the normal control is set to the theoretical air-fuel ratio (combustion air-fuel ratio=14.7). In addition, for example, as shown in FIG. 3, during the elapsed time t5 to t6, when the combustion air-fuel ratio is shifted from the secondary combustion air-fuel ratio KAP2 to the tertiary combustion air-fuel ratio KAP 3, in order to avoid the uneven torque of the engine 1, the combustion injection amount is set so that the combustion air-fuel ratio is smoothly shifted. After the elapsed time t6, the tertiary combustion air-fuel ratio KAP3 is controlled to be approximately a constant value (theoretical air-fuel ratio).

Moreover, although it is not shown in FIG. 3, when the combustion air-fuel ratio is controlled to be the secondary combustion air-fuel ratio KAP2 (combustion air-fuel ratio=10), in other words, when the combustion air-fuel ratio is controlled in a feedback manner in the flowchart in FIG. 2, if the intake air flow rate is rapidly changed (becomes the predetermined flow rate or greater during the predetermined time), at the step S11, it is determined that the operating condition is non-stationary and at the steps 6 to 9, the change in the combustion air-fuel ratio is controlled from the secondary air-fuel ratio KAP 2 to the first combustion air-fuel ratio KAP 1, so that the combustion air-fuel ratio can be switched from feedback control to open control.

In this case, at the step S6, when the combustion air-fuel ratio is controlled from the secondary air-fuel ratio KAP 2 to the primary combustion air-fuel ratio KAP 1, in order to limit uneven torque due to a rapid change in the combustion air-fuel ratio, the change rate of the combustion air-fuel ratio is limited. The limitation of the change rate of the target combustion air-fuel ratio KAP 1 is carried out such that, when the current combustion air-fuel ratio is switched to the primary combustion air-fuel ratio KAP 1, if the difference between the current combustion air-fuel ratio and the primary combustion air-fuel ratio KAP 1 is at or greater than the predetermined value, then it is determined that the rate change is large, and the target combustion air-fuel ratio is set to be a combustion air-fuel ratio that differs by the predetermined upper limit value from the current combustion air-fuel ratio in the direction of the primary combustion air-fuel ratio KAP 1. After that, the above-mentioned Steps 7 and 9 are executed.

Thus, when the change rate for the combustion air-fuel ratio is limited, the uneven torque of the engine 1 can be avoided by smoothly shifting the combustion air-fuel ratio from the secondary air-fuel ratio KAP 2 to the primary combustion air-fuel ratio KAP 1. In addition, after the transition, the primary combustion air-fuel ratio KAP 1 can be controlled to be approximately a constant value (combustion air-fuel ratio=12).

In the present embodiment, the internal combustion engine comprises a fresh air supplying device 13 that can supply fresh air upstream of the exhaust purification catalyst 10 that is arranged downstream of the exhaust passages 8a and 8b, wherein when warming up of the catalyst 10 is required, the combustion air-fuel ratio of the combustion chamber is controlled so as to be rich, and at the same time, the fresh air supplying device 13 is activated to supply fresh air into the exhaust passages 8a and 8b. The internal combustion engine comprises the exhaust air-fuel ratio sensors 9a and 9b that detect the exhaust air-fuel ratio, upstream of the catalyst and downstream of the fresh air supplying position, an exhaust air-fuel ratio sensor activation determination means (Step 5) that determines the activation or non-activation of the exhaust air-fuel ratio sensors 9a and 9b, and a combustion air-fuel ratio controlling means (the steps 7-9, 10, and 13-18) that open-controls the combustion air-fuel ratio to be the primary combustion air-fuel ratio KAP 1 (for example KAP1=12) capable of the stable combustion, between the theoretical air-fuel ratio and the combustion limit air-fuel ratio which is richer than the theoretical air-fuel ratio that controls, when the warming up of the catalyst 10 is required (Step 2) and the exhaust air-fuel ratio sensors 9a and 9b are not activated, and that controls, in a feedback manner, the combustion air-fuel ratio to be the secondary combustion air-fuel ratio KAP 2 (for example KAP=10) which is a richer side than the primary combustion air-fuel ratio and that is close to the combustion limit air-fuel ratio, while estimating the combustion air-fuel ratio in the combustion chamber based on the exhaust air-fuel ratio detected by the exhaust air-fuel ratio sensors 9a and 9b, when the exhaust air-fuel ratio sensors 9a and 9b are activated. Therefore, if the exhaust air-fuel ratio sensors 9a and 9b are not activated when the warming up of the catalyst 10 is requested, the combustion air-fuel ratio is changed to the primary combustion air-fuel ratio KAP 1 in an open control manner, thereby sufficiently securing the combustion stability and preventing deterioration of the operation or misfires. In addition, if the exhaust air-fuel ratio sensors 9a and 9b are activated, the combustion air-fuel ratio is changed to the secondary combustion air-fuel ratio KAP 2 in a feedback manner, thereby allowing a sufficient supply of non-burned components in the exhaust for the catalyst so as to increase the catalyst temperature and to demonstrate the exhaust purification function of the catalyst and therefore, the exhaust can be improved.

According to the present embodiment, the fresh air flow amount detection device 18 that detects (step S4) the fresh air flow amount Qa2 that is supplied to the exhaust passages 8a and 8b is provided, and the combustion air-fuel ratio is estimated based on the exhaust air-fuel ratio AFex that is detected by the exhaust air-fuel ratio sensors 9a and 9b, the fresh air flow amount Qa2 that is detected by the fresh air flow amount detection device 18, and the combustion supplying amount Ti at that time (step S14). Therefore, feedback control can be accurately carried out so that the combustion air-fuel ratio will be the secondary combustion air-fuel ratio KAP2 based on the exhaust air-fuel ratio AFex, the fresh air flow amount Qa2 and the fuel supply amount Ti.

According to the present embodiment, a stationary detection device (step S11) that determines whether or not the operation status of the internal engine 1 is stationary is provided, wherein when the operating condition is determined to be non-stationary, the combustion air-fuel ratio control device open-controls the combustion air-fuel ratio to the first combustion air-fuel ratio KAP 1, even if the exhaust air-fuel ratio sensors 9a and 9b are active. Therefore, for example, the state where the combustion air-fuel ratio is controlled to be the secondary combustion air-fuel ratio KAP 2 in a feedback manner can be switched to the state where the combustion air-fuel ratio is open-controlled to be the first combustion air-fuel ratio KAP 1. Consequently, a deterioration of the operation or misfires due to the fluctuation of the combustion air-fuel ratio control at the second combustion air-fuel ratio KAP 2 near the combustion limit air-fuel ratio can be prevented.

Furthermore, according to the present embodiment, the operation condition determination unit determines that the operating condition is non-stationary when the change in the intake air flow amount Qa1 of the internal combustion engine is at or greater than the predetermined level (Step 11). Therefore, for example, when the combustion air-fuel ratio is controlled to be the secondary combustion air-fuel ratio KAP 2 in a feedback manner and it becomes a transient condition in which the intake air flow amount greatly changes, the operation is changed to the open-control, whereby the deterioration of the operation and misfires can be prevented by changing to the primary combustion air-fuel ratio KAP 1 that allows stable combustion.

Moreover, according to the present embodiment, a change rate limitation controller (Steps 6 and 12) that limits the change rate of the combustion air-fuel ratio when the combustion air-fuel ratio control means carries out open control or feedback control is provided so as to allow a smooth transition of the combustion air-fuel ratio, thereby avoiding the uneven torque of the engine 1.

The preceding description has been presented only to illustrate and describe exemplary embodiments of the methods and systems of the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A combustion air-fuel ratio control system for an internal combustion engine comprising:

exhaust guiding means for guiding exhaust from the internal combustion engine;

exhaust purification means, arranged downstream of the exhaust guiding means, for purifying the exhaust;

fresh air supplying means for supplying fresh air to the exhaust guiding means at a fresh air supplying position upstream of the exhaust purification means;

exhaust air-fuel ratio sensing means for detecting an exhaust air-fuel ratio of the exhaust at a location between the exhaust purification means and the fresh air supplying position;

exhaust air-fuel ratio sensor activation determining means for determining whether or not the exhaust air-fuel ratio sensing means is active; and combustion air-fuel ratio control means for controlling a combustion air-fuel ratio of the internal combustion engine based on the exhaust air-fuel ratio that is detected by the exhaust air-fuel ratio sensing means by controlling the fresh air from the fresh air supplying means to the exhaust guiding means when warming up of the exhaust purification means is requested, the combustion air-fuel ratio control means further performing a function of open controlling the combustion air-fuel ratio in a combustion chamber to be a primary combustion air-fuel ratio which is between a theoretical air-fuel ratio and a combustion limit air-fuel ratio that is richer than the theoretical air-fuel ratio upon the exhaust air-fuel ratio sensor activation determining means determining the exhaust air-fuel ratio sensing means to be inactive, and the combustion air-fuel ratio control means further performing a function of feedback controlling the combustion air-fuel ratio to be a secondary combustion air-fuel ratio that is richer than the primary combustion air-fuel ratio and upon the exhaust air-fuel ratio sensor activation determining means determining the exhaust air-fuel ratio sensing means to be active.

2. A combustion air-fuel ratio control system for an internal combustion engine comprising:

an exhaust passage where exhaust from the internal combustion engine is guided;

an exhaust purification catalyst arranged downstream of the exhaust passage;

a fresh air supplying device arranged upstream of the exhaust purification catalyst to supply fresh air to the exhaust passage;

an exhaust air-fuel ratio sensor disposed between the exhaust purification catalyst and the fresh air supplying device and arranged to detect an exhaust air-fuel ratio of the exhaust;

an exhaust air-fuel ratio sensor activation determining unit that determines whether or not the exhaust air-fuel ratio sensor is active; and a combustion air-fuel ratio control unit configured to control a combustion air-fuel ratio of the internal combustion engine based on the exhaust air-fuel ratio that is detected by the exhaust air-fuel ratio sensor by controlling the fresh air from the fresh air supplying device to the exhaust passage when warming up of the exhaust purification catalyst is requested, the combustion air-fuel ratio control unit open controlling the combustion air-fuel ratio to a primary combustion air-fuel ratio which is between a theoretical air-fuel ratio and a combustion limit air-fuel ratio that is richer than the theoretical air-fuel ratio upon the exhaust air-fuel ratio sensor activation determining unit determining the exhaust air-fuel ratio sensor to be inactive, and the combustion air-fuel ratio control unit feedback controlling the combustion air-fuel ratio to a secondary combustion air-fuel ratio that is richer than the primary combustion air-fuel ratio upon the exhaust air-fuel ratio sensor activation determining unit determining the exhaust air-fuel ratio sensor to be active.

3. The combustion air-fuel ratio control system for an internal combustion engine according to claim 2, further including an air amount detection unit that detects fresh air amount supplied to the exhaust passage, and a combustion air-fuel ratio estimation unit that estimate the combustion air-fuel ratio based on current fuel supply amount and the fresh air amount detected by the fresh air amount detection unit.

4. The combustion air-fuel ratio control system for an internal combustion engine according to claim 2, further including an operation condition determination unit that detects whether an operating condition of the internal combustion engine is stationary or non-stationary, wherein when the operation condition determination unit determines that the operating condition is non-stationary, even if the exhaust air-fuel ratio sensor is active, the combustion air-fuel ratio control unit open-controls the combustion air-fuel ratio to be the primary combustion air-fuel ratio.

5. The combustion air-fuel ratio control system for an internal combustion engine according to claim 4, further including an intake air amount detection unit that detects an intake air amount to the internal combustion engine, wherein the operation condition determination unit determines that the operating condition is non-stationary when a change rate of the intake air amount to the internal combustion engine is at or greater than a predetermined value.

6. The combustion air-fuel ratio control system for an internal combustion engine according to claim 2, wherein the combustion air-fuel ratio control unit includes a change rate limiting unit that limits a change rate of the combustion air-fuel ratio when open control or feedback control is carried out.

7. An air-fuel ratio controlling method for an internal combustion engine, including an exhaust purification catalyst that is arranged in an exhaust passage where exhaust from the internal combustion engine flows, a fresh air supplying device that supplies fresh air upstream of the exhaust purification catalyst, an exhaust air-fuel ratio sensor that detects an exhaust air-fuel ratio between the exhaust purification catalyst and the fresh air supplying device in the exhaust passage, the air-fuel ratio controlling method comprising:

determining whether or not the exhaust air-fuel ratio sensor is active;

determining timing of a request for warming up the exhaust purification catalyst;

setting a combustion air-fuel ratio to a primary combustion air-fuel ratio, which is between a theoretical air-fuel ratio and a combustion limit air-fuel ratio, which is richer than the theoretical air-fuel ratio and allows stable combustion in an open control, while supplying fresh air from the fresh air supplying device to the exhaust passage, when warming up of the exhaust purification catalyst is required, and the exhaust air-fuel ratio sensor is inactive; and setting the combustion air-fuel ratio to a secondary combustion air-fuel ratio, which is richer than the primary combustion air-fuel ratio and close to the combustion limit air-fuel ratio in a feedback control, while supplying fresh air from the fresh air supplying device to the exhaust passage, when the warming up of the exhaust purification catalyst is required, and the exhaust air-fuel ratio sensor is active.

* * * * *